3,496,058
METALLIC FOAM LAMINATE
Richard C. Schroter, Orinda, and Richard J. Ross, Moraga, Calif., assignors to Kaiser Aluminum & Chemical Corporation, Oakland, Calif., a corporation of Delaware
Filed Nov. 7, 1966, Ser. No. 592,622
Int. Cl. B32b 5/18, 15/08, 27/40
U.S. Cl. 161—119                    9 Claims

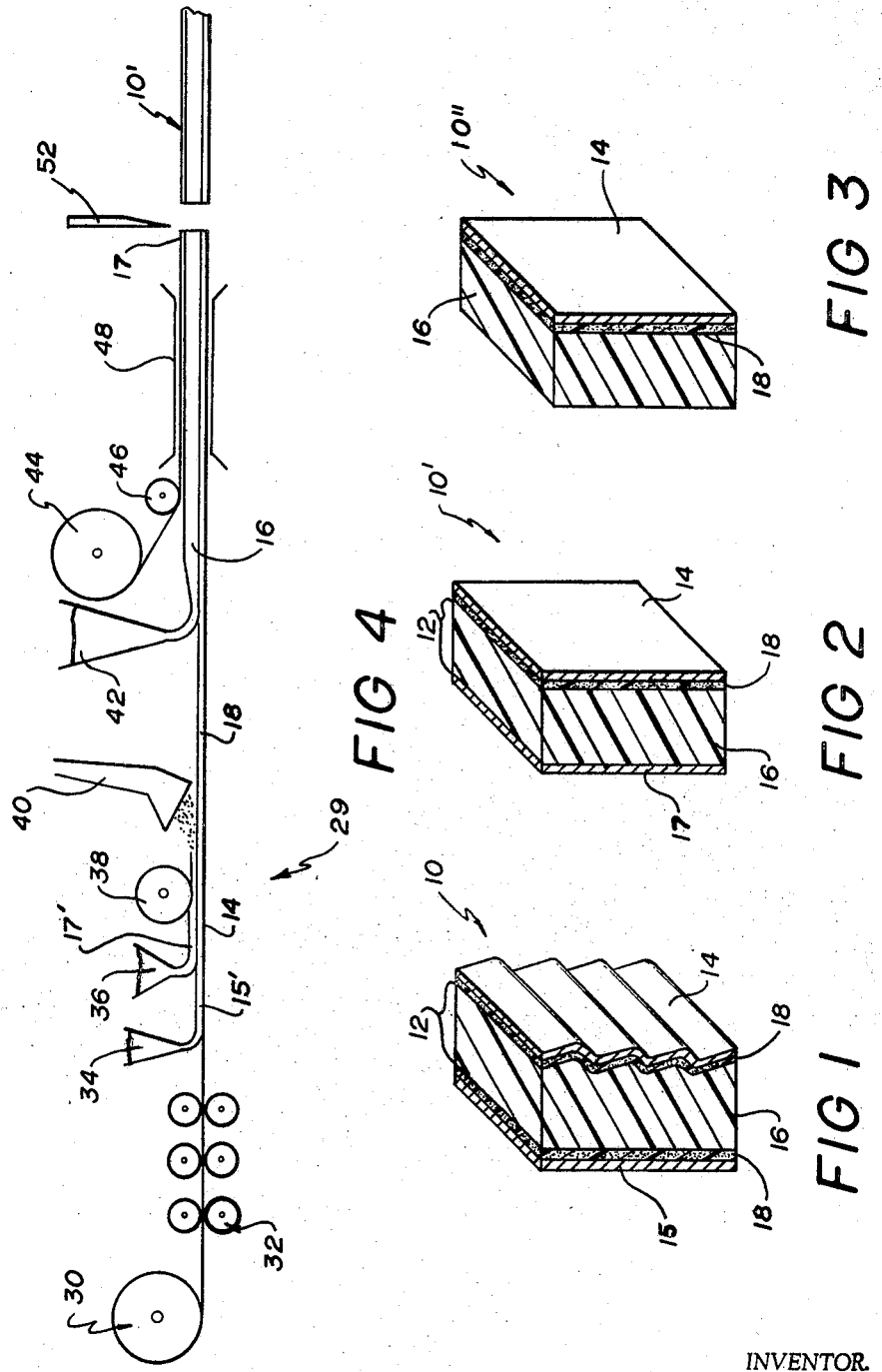

ABSTRACT OF THE DISCLOSURE

A metallic-foam laminate having improved impact and dent-resistant properties including a metallic layer bonded to a foam with a semi-elastomeric layer comprising an admixture of inert particulate material within a polyurethane adhesive mass. The metallic surface of the laminate may be embossed and an additional layer may be laminated to the opposite surface of the laminate.

---

This invention relates to a laminated article and more partcularly to an improved laminated article comprised of at least one metallic outer layer of any suitable configuration, and inner foamed and semi-elastomeric layers wherein, due to the improved fashion in which the semi-elastomeric layer is constructed, the article will, among other things, have excellent impact and dent-resistant properties.

Accordingly, it is a primary purpose of the instant invention to provide an improved laminated article that can be economically produced from readily available materials and is comprised of at least one outer dent-resistant, metallic layer of a suitable configuration joined to an inner layer of a foamed material.

The aforesaid and other objects and advantages of the instant invention will become more apparent from a review of the following detailed description when taken in conjunction with the accompanying drawing, wherein:

FIG. 1 is an enlarged perspective view of a laminated article embodying the teachings of the instant invention;

FIG. 2 is a view similar to FIG. 1 and illustrates another laminated article embodying the teachings of the instant invention;

FIG. 3 is a view similar to FIGS. 1 and 2 and illustrates a further embodiment of the instant invention; and FIG. 4 is a schematic view of one suitable type of apparatus that can be used to produce laminated articles embodying the teachings of the instant invention.

With further reference to the drawing and particularly FIGS. 1–3, the preferred laminated article embodiments 10, 10' and 10'' of the instant invention generally comprise at least one outer metallic sheet layer 14 of any suitable configuration, an inner foamed layer 16 and an intermediate layer 18 which is hereinafter referred to as a semi-elastomeric layer. The metallic sheet layer 14 can have either a planar or non-planar configuration as indicated in the drawings and is preferably made of thin metal such as aluminum or an aluminum alloy on the order of between 0.0015" to 0.050" in thickness.

The term "semi-elastomeric layer" as used throughout the specification and claims is intended to refer to a layer 18 which in a preferred embodiment is comprised of an elastomeric reaction product of a polyisocyanate and a polyol appropriately mixed with inert particulate or granular material, such as sand, alumina or the like. The particulate material used should also be fully compatible with the elastomeric reaction product and be relatively harder than the said reaction product when the reaction product sets and hardens. The preferred volume ratio of particulate material to the aforesaid elastomeric rection product used in layer 18 is on the order of from 1:1 to 4:1. Considered from another aspect for any given unit volume of layer 18 the weights of the particulate material relative to the weights of the elastomeric reaction product are preferably in the ratios of 3:1 to 10:1. The over-all thickness of semi-elastomeric layer 18 is preferably at least equal to that of the metallic sheet layer 14.

The particulate material of layer 18 such as sand can be of a coarse, medium or fine grain or mixtures thereof, and the particulate material is advantageously compacted into the elastomeric reaction product in order to assure a proper and preferably substantially uniform dispersal of the particulate material therein. The elastomeric reaction product performs the dual function of adhesively bonding the individual particles of the particulate material of layer 18 together as well as to the metallic layer 14, which it backs up.

The resinous materials employed for foam layer 16 and the semi-elastomer back-up layer 18 may be of the same, similar or dissimilar resinous composition depending upon the desired physical properties of the completed unitary structure. Thus, for example, foamed layer 16 and the resinous portion of semi-elastomer back-up layers 18 may all be formed from polyurethane resins. On the other hand, foamed layer 16 may be formed of a polyurethane resin, while the resinous portion of back-up layer 18 in the same composite structure may be formed from an epoxy resin, a polystyrene resin, or a dissimilar polyurethane resin.

In general, since the choice of resinous materials for any particular embodiment of this invention is dictated by the desired physical properties to be attained, the resinous materials can be obtained from a wide variety of resinous materials, such as polyester resins, polyvinyl resins, silicones (polysiloxanes), polystyrene resins, phenolic resins and, as previously mentioned, polyurethane resins and epoxy resins. Additionally, natural or synthetic rubber materials can be utilized.

It has been found that certain polyurethane materials are particularly well suited to the purposes of this invention and, such materials are advantageously employed to form both the foamed layer 16 and the intermediate layer 18. These polyurethane resins are formed by the reaction of polymethylene polyphenylene isocyanate having the formula

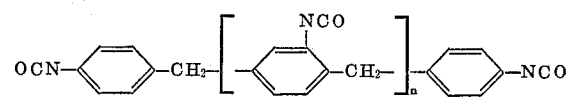

where N has a value between about 0.5 to about 0.8 and the isocyanate equivalent weight is in the range of approximately 130–140 (depending upon purity of the polyisocyanate) with approximately the same hydroxyl equivalent of a polyol or blend of polyols, having primary or secondary aliphatic hydroxyl groups, said polyols being the result of reaction of ethylene oxide or propylene oxide with water, trimethylolpropane, pentaerythritol, sorbitol, or other suitable coreactant, and selected so that the average hydroxyl number is in the range of 150–260, the average molecular weight is in the range 670–1750, and the product of the average hydroxyl number times the average molecular weight is in the range of 168,000 to 263,000.

It is to be understood that the term "resin" as used herein includes polymers in the liquid state as well as those in the semi-solid and solid state.

Specific examples of the presently preferred polyurethane formulations follow:

EXAMPLE 1

1.05 equivalents of a polymethylene polyphenylene isocyanate having a N value of about 0.5 to about 0.8 and equivalent weight of about 131–140 are admixed with 1.00 equivalent of a polyol made by admixture of 80 parts by weight of propylene oxide adduct of trimethylolpropane with 20 parts by weight of propylene oxide adduct of sorbitol. The polyol has an average hydroxyl number of 173.5 and an average molecular weight of 1379.

EXAMPLE 2

1.05 equivalents of a polymethylene polyphenylene isocyanate having a N value of about 0.5 to about 0.8 and equivalent weight of about 131–140 are admixed with 1.00 equivalent of a polyol made by admixture of 80 parts by weight of propylene oxide adduct of trimethylolpropane with 20 parts by weight of proylene oxide adduct of pentaerythritol. The polyol mixture has an average hydroxyl number of 197.5 and an average molecular weight of 1308.

EXAMPLE 3

1.05 equivalents of a polymethylene polyphenylene isocyanate having a N value of about 0.5 to about 0.8 and equivalent weight of in the range of 131–140 are admixed with 1.00 equivalent of a polyol made by admixture of 70 parts by weight of polyether diol obtained by reacting propylene glycol and propylene oxide with 30 parts by weight of propylene oxide adduct of propylene glycol. The resulting polyol mixture has an average hydroxyl number of 206.4 and an average molecular weight of 970.

It is to be understood that the polyol and polyisocyanate liquid admixture in any of the three above examples is subjected to appropriate curing conditions at a later time during the formation of the unitary structure of this invention. Suitable curing conditions for the aforementioned examples for forming the polyurethane resin are preferably at room temperature or at an elevated temperature sufficiently above room temperature in conjunction with an appropriate catalyst as part of the chemical reactive mixture such as tertiary amines and stannous oleate, etc.

The cured polyurethane products of Examples 1, 2 and 3 all had Shore A hardnesses respectively of 80, 91 and 93 and had excellent flexibility and impact resistance. Thus, the cured products of Examples 1, 2 and 3 all passed the Federal Test for Military Standards 141, Method 6221. Further, when the products of Examples 1, 2 and 3 were subjected to impact loads of 80 inch pounds in accordance with the Gardner reverse impact procedure, all of the products passed the impact load of 80 inch pounds.

The liquid admixtures of Examples 1, 2 or 3 are advantageously applied to an appropriate one of the layers of the product to be produced in accordance with the teachings of the invention such as layer 14 and the admixture allowed to cure under appropriate curing conditions in situ. The particular method and means by which the liquid admixture is either foamed (to form foamed layer 16) or further admixed with inert particulate material (to form semi-elastomeric layers 18) will be described in further detail hereinafter.

The polyurethane products formed from any one of the Examples 1, 2 and 3 above have excellent bonding characteristics particularly when used in a semi-elastomeric layer 18. The particulate material is preferably disposed in the plastic bonding agent or elastomeric material or layer 18 while the elastomeric material is in a liquid or semiliquid state, and it is preferably uniformly dispersed therein.

The foamed layer 16 in each of FIGURES 1, 2 and 3 is preferably made from polyurethane resins of the same or similar type as those heretofore described with reference to Examples 1, 2 and 3 and containing, in addition, a foaming agent or agents, and stabilizers (to control the rate of foaming). Several specific examples of a formulation employed in the forming of the foamed layer 16 are now set forth which formulations are suitable for use in combination with any of above Examples 1, 2 and 3 as the resinous material of the bonding layer 16.

One example of a suitable material for foam that is compatible with any one of the three exemplary polyurethane resins given above is the chemical mixture as follows: 60 parts by weight of propylene oxide adduct or sorbital, 20 parts by weight of propylene oxide adduct of sucrose, 9.7 parts by weight of a phosphorus-containing polyol, where the average hydroxyl number is in the range of 440 to 480; 20 to 30 parts by weight of trichlorofluoromethane, 1½ parts by weight of a silicone surface active agent, 1½ parts by weight of dimethylethanolamine, ½ parts by weight triethylene diamine and lastly 138.5 parts by weight of polymeric isocyanate.

Another example of a suitable foam is the chemical mixture as follows: 57 parts by weight of propylene adduct of sucrose; 36 parts by weight of a phosphorous containing polyol, where the average hydroxyl number is in the range of 440 to 480; 26 parts by weight of trichlorofluoromethane; 20 parts by weight of silicone surface active agent; 0.3 part by weight of tetramethylbutane diamine and lastly 116.0 parts by weight of polymeric isocyanate.

In general, it is preferred that the foamed layer 16 have a density of not less than 2.0 pounds per cubic foot along with a compressive strength, dimensional stability, impact strength, and other physical, electrical and chemical properties which are dependent upon the particular chemical and physical environment to which a product made in accordance with the teachings of the invention is to be subjected. It is also highly desirable that layer 16 have good resistance to the transfer of sound and heat. It is to be observed here that the desired temperature conditions for the forming of the aforementioned examples of foamable mixtures are room temperature or any suitable temperature above room temperature.

As indicated in the drawings the laminated articles of the invention can have a pair of opposed outer metal facings instead of a single metallic facing 14. For example, the article of FIG. 1 can have a second metallic facing or layer 15 similar to layer 14 together with a second semi-elastomeric layer 18 interposed between the foamed layer 16 and the second metallic layer 15. The article of FIG. 2 can have a second metal facing 17 or layer similar to layer 14. In this case, however, layer 17 is directly bonded to the foamed layer 16. In any event, the articles of FIGS. 1, 2 and 3 will each have at least one metallic layer 14, one semi-elastomeric layer 18 and one foamed layer 16. In the case of the dual covered articles of FIGS. 1 and 2 the foamed layer 16 can be regarded as a core 12.

The use of a particulate material in the manner described in a semi-elastomeric layer 18 of the type described, which is then advantageously bonded to or fully integrated with a relatively thin metallic layer 14, is significant in that the rigidity of the monolithic mass of layer 18 resulting primarily from the use of the particulate material is effectively translated to the thin outer metal facing or layer 14. By thus rigidizing the metallic layer 14 by virtue of the semi-elastomeric layer 18, the impact and dent resistance of the relatively thin metallic layer 14 is materially increased. The buckling resistance of the thin metallic layer is also enhanced to some extent.

From the above it will now be evident how the use of the semi-elastomeric layer 18 in turn makes the use of a thin metallic outer facing or layer 14 of either planar or complex configurations in building products and the like feasible as well as economic. For example, building products embodying the instant invention can be readily used as siding for houses or mobile homes wherein the metallic facing or layer 14 is exposed to the elements while being at the same time manufactured efficiently, economically and at relatively rapid speeds.

The improved dent resistance of the metallic facings or coverings of 14 or 15 of the laminated articles which are backed up by a semi-elastomeric layer 18 and has been satisfactorily demonstrated by virtue of a series of specific dent tests applied to randomly selected product samples of laminated articles made in accordance with the teachings of the instant invention. In these tests the various product samples had foamed layers of varying densities and different amounts of particulate materials in the semi-elastomeric layers. In all instances, the samples were subjected to an impact test involving a mandrel weighing one pound and having the geometrical configuration of a projectile, the impacting end of which was curved with a radius of ¾".

The test sample of 1–3 below comprised a foam layer 16 of 1½" thickness. Two aluminum metal alloy facings, each of which was .019" in thickness were directly bonded to the foam layer 16 without the use of an intermediate semi-elastomeric layer 18.

In test samples 4–6 below, each test sample had a structure similar to the article shown in FIG. 2 of the drawing with the semi-elastomeric layer having a thickness approximately twice that of metal facing 14. The foam layers were 1½" in thickness and both metallic facings 14 and 17 were .019" in thickness. All test samples 1–6 measured approximately two feet in width by eight feet in length.

During the impact tests all samples were supported on one side by a flat surface and the mandrel was dropped from a point located approximately 36" above the surface of the top-side metallic sheet layer of the samples and at a point located in a central portion of the test sample. In the tests of samples 4–6 the semi-elastomeric layer was always directly underneath the top-side layer 14 exposed to the mandrel. The results were as follows:

| Ex. No. | Elastomeric material (polyisocyanate and polyol) disposed in grams per unit sq. ft. in over-all semi-elastomeric layer | Lbs. of particulate material (sand) disposed per unit sq. ft. in over-all semi-elastomeric layer | Foam density (lbs./ft.$^3$) | Dent depth in inches |
|---|---|---|---|---|
| 1 | None | None | 2.18 | 0.110 |
| 2 | None | None | 2.29 | 0.090 |
| 3 | None | None | 2.40 | 0.097–0.131 |
| 4 | 40 | 0.96 lb. All particles coarse grain size (.5 mm. to 1 mm.). | 2.19 | 0.038 |
| 5 | 44 | 1.18 lbs. All particles coarse grain size (.5 mm. to 1 mm.). | 2.36 | 0.014 |
| 6 | 20 | 0.50 lbs. All particles medium grain size (.25 mm. to .5 mm.). | 2.25 | 0.020 |

The above tests demonstrate that the first three samples from which a semi-elastomeric layer 18 was absent were materially less impact and dent resistant than the samples 4–6 which included a semi-elastomeric layer 18. The Examples 4 and 5 with the relatively higher amounts of coarse grain sand had a dent resistance similar to sample number 6 with the relatively low amount of medium grain sand. Consequently, depending upon the mesh size of the sand whether coarse, medium, or fine, there will usually be an optimum amount of sand for each mesh size of particulate material in order to assure the desired resistance to denting of the sheet layer 14 as long as it is also consistent with the production techniques and processes used to produce a given product.

In all of the above examples, the aluminum alloy layer was made from one commercially identified as 3105–H14. The chemical composition limits of such an aluminum alloy as listed with the Aluminum Association is as follows.

| Elements: | 3105 aluminum alloy |
|---|---|
| (1) Silicon | 0.60 |
| (2) Iron | 0.70 |
| (3) Copper | 0.40 |
| (4) Manganese | 0.30–1.5 |
| (5) Magnesium | 0.20–0.80 |
| (6) Chromium | 0.25 |
| (7) Zinc | 0.40 |
| (8) Titanium | 0.10 |
| (9) Other elements, each | 0.05 |
| (10) Other elements, total | 0.15 |
| (11) Aluminum | Remainder |

It is to be understood that in the above composition the percentages are maximum figures unless shown as a range.

The 3105 designation of the 3105–H14 aluminum alloy indicates the composition as set forth in the paragraph above, while H14 is a temper designation that indicates the metal has been strain hardened to a relatively half-hard temper. Although the temper of the metal facings in the samples tested played some part in the layer 14 resistance to denting, the dent resistance of layer 14 in samples 4–6 was primarily produced by use of a semi-elastomeric back-up layer 18.

Although the various layers 14, 15, 16, 17 and 18 readily lend themselves to being assembled together into an improved unitary product by various economic equipment and processes well known in the art, one suitable apparatus 29 for mass producing in a continuous fashion a laminated article 10' of FIG. 2 and embodying the teachings of the instant invention will now be described.

The mass production apparatus 29 of FIG. 4 generally comprises a continuous production line made up of a series of successive processing stations. Suitably arranged at the left-hand end of the line as viewed in FIG. 4, is a series of opposed pairs of power driven rolls 32.

The power driven rolls 32 act to continuously pull and unwind a metallic sheet such as an aluminum sheet which forms the layer 14 from a coil 30 and to pass the sheet continuously and at an appropriate speed to a suitable applicator device 34. Applicator device 34 applies a given amount of a curable elastomer 15' such as a reaction product of a polyisocyanate and a polyol forming part of layer 18 in a liquid or plastic state to the upwardly facing surface of the moving metallic sheet forming layer 14. The applicator 34 can be a nozzle, which is adapted to sweep across the width of the longitudinally driven sheet so as to apply a desired amount of the aforesaid reaction product thereto.

After the application of the reaction product 15' to the metallic sheet forming layer 14, a predetermined amount of particulate materials 17', such as coarse, medium or fine sand and preferably of a uniform mesh size, all as described above, is deposited by a particular material applicator 36 of standard design directly onto the reaction product 15' covering the moving metallic sheet forming layer 14. The applied amount of sand 17' can then be compacted uniformly throughout the underlying reaction product by means of a suitable compacting roller 38. After initial setting or curing of the reaction product at room or at the deserved elevated temperature, an exhaust hood 40 of any suitable design and located the appropriate distance aft of the compacting roller 38 removes the excess sand in a known manner from the compacted layer 18. It is to be understood, of course, that the applicators 34 and 36, compacting roller 38 and exhaust hood 40 are all selectively controlled relative to each other and to the speed of movement of the composite web formed of metallic layer 14 and the reaction product 15' of layer 18 whereby the particulate material 17' can be applied in the proper amount by weight relative to the deposited amount by weight per unit square foot of the reaction product 15' all as described previously. The same procedure is likewise true as regards the deposition of reaction product 17' on layer 14.

As the now covered metallic sheet that forms layer 14 continues to move in a continuous fashion to the right as viewed in FIG. 4 and after the compaction of the particulate material 17' in layer 18, a further applicator 42 can be used to deposit a layer of foam 16 to the exposed major surface of layer 18. Applicator 42 can be similar in construction and operation to the other applicators 34 and 36 and can apply the foam by any suitable technique or manner well known in the art such as frothing or spraying. It is to be understood, of course, depending on the particular foam type material used for layer 16 that the produced foam may either set immediately or require aging. If aging is required, appropriate heating equipment (not shown) can be used to promote such aging whereby the line 29 can still retain its continuous operating characteristics. In order to assure satisfactory bonding of the foamed layer 16 to the now compacted layer 18, layer 16 can include as part of its composition the same elastomeric material as that of layer 18.

In the event the product requires a second metal facing after application of the foam layer 16 to the advancing composite web formed of layers 14 and 18 a second coil 44 of aluminum sheet constituting a second facing or covering 17 can be unwound by suitable means (not shown), passed around an idler roller 46 and then applied to the top exposed major face of the foamed layer 16. Thereafter the final assemblage of two outer metallic sheet layers 14 and the inner foam and semi-elastomeric layers 16 and 18 is passed through an appropriate heating and/or pressure applying zone at which time the over-all assemblage of the various layers are finally bonded together to form the unitary product 10'. The density of the foamed layer can be controlled by the type and amount of blowing agent employed in the chemical mixture discharged by the applicator 42.

A cutting saw 52 located aft of the curing station 48 can be operated in a known manner to periodically sever the mass produced laminated article 10' into the desired lengths as the various bonded layers advance along the line 29 in a continuous fashion.

During operation of line 29 it is to be understood that both sheet layers 14 and 17 can, if desired, be heated as they are uncoiled from coils 30 and 44, whereby they will be at an optimum temperature for promoting adhesion of the materials 34 and 42 thereto.

From the above description it will be seen that a further advantage in the use of particulate material in the manner proposed resides in the fact that it is well adapted to be applied to or incorporated in the desired product by readily available mass production techniques and processes despite the fact that the final desired product may have a somewhat irregular and nonplanar configuration or other exacting specifications.

Advantageous embodiments of the instant invention have been disclosed and described. It will be obvious that various changes and modifications may be made therein without departing from the spirit and scope thereof as defined by the following claims wherein what is claimed is:

1. A laminated article for use as a structural element or the like, said article including a thin metallic layer, a layer of foamed polyurethane and an intermediate semi-elastomeric layer comprised of an admixture of inert, particulate material lying within an adhesive mass, said intermediate semi-elastomeric layer being interposed between and securing said metallic and said foamed layers together, said adhesive mass of the semi-elastomeric layer comprising a polyurethane which is the reaction product of a polyol and an organic polyisocyanate and the particulate material of the semi-elastomeric layer being fully compatible with said adhesive mass and of greater hardness than said adhesive mass upon the setting and hardening of said adhesive mass, the said layers of said article combining to form an integrated structure and the overall impact and dent resistance of the metallic layer being substantially greater than that of said thin metallic layer by itself.

2. The article of claim 1 wherein said metallic layer consists of a metal selected from the group consisting of aluminum and aluminum alloys.

3. The article of claim 1 wherein said polyurethane of said intermediate layer is formed by the reaction of a polyisocyanate having the formula

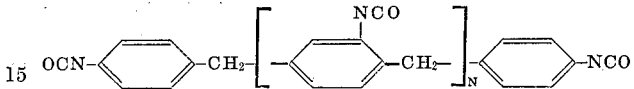

wherein N has a value of about 0.5 to about 0.8 with an approximately equal number of equivalents of a polyol selected from the group consisting of those polyols having an average hydroxyl number in the range of 150 to 250, the average molecular weight of the polyurethane formed being between about 670 to about 1750.

4. The article of claim 1 wherein said polyurethane of said intermediate layer is formed by the reaction of a polyisocyanate having the formula

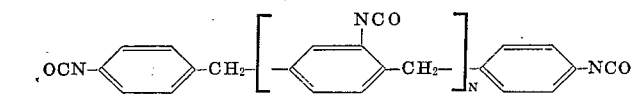

wherein N has a value of about 0.5 to about 0.8 with an approximately equal number of equivalents of a polyol selected from the group consisting of those polyols having an average hydroxyl number in the range of 150–260 and resulting from the reaction of ethylene oxide and water, and propylene oxide and water, the average molecular weight of the polyurethane formed being between about 670 to about 1750, and the average hydroxyl number times the average molecular weight being in the range of about 168,000 and about 263,000.

5. A laminated article as set forth in claim 1 including a further metallic layer bonded to the exposed major face of said foamed layer in opposition to said metallic layer.

6. A laminated article as set forth in claim 1 in which said metallic layer is of nonplanar configuration.

7. A laminated article as set forth in claim 5 wherein one of said metallic layers is of nonplanar configuration.

8. A laminated article as set forth in claim 1 wherein the ratio of the volume of particulate material to the volume of the material making up said adhesive mass in said semi-elastomeric layer is from 1:1 to about 4:1.

9. A laminated article as set forth in claim 1 wherein the particulate material is uniformly distributed within the adhesive mass.

References Cited

UNITED STATES PATENTS

| | | | |
|---|---|---|---|
| 3,170,832 | 2/1965 | Wilson et al. | 156—331 XR |
| 3,240,736 | 3/1966 | Beckwith | 156—331 XR |
| 3,397,106 | 8/1968 | Moseley | 161—162 XR |
| 3,428,609 | 2/1969 | Chilvers et al. | 161—190 XR |
| 3,432,451 | 3/1969 | Kales | 161—190 XR |
| 3,437,536 | 4/1969 | Vincent et al. | 161—160 XR |

ROBERT F. BURNETT, Primary Examiner

WILLIAM A. POWELL, Assistant Examiner

U.S. Cl. X.R.

52—309; 156—79, 220, 330, 331; 161—123, 160, 161, 190; 264—45